(12) United States Patent
Ohara

(10) Patent No.: US 10,645,510 B2
(45) Date of Patent: May 5, 2020

(54) MANUFACTURING METHOD OF A SPEAKER VIBRATING DIAPHRAGM BY CONTROLLING A RATIO OF FIBER MATERIALS

(71) Applicant: Hiroshi Ohara, Taoyuan (TW)

(72) Inventor: Hiroshi Ohara, Taoyuan (TW)

( * ) Notice: Subject to any disclaimer, the term of this patent is extended or adjusted under 35 U.S.C. 154(b) by 0 days.

(21) Appl. No.: 16/600,700

(22) Filed: Oct. 14, 2019

(65) Prior Publication Data

US 2020/0045486 A1 Feb. 6, 2020

Related U.S. Application Data

(63) Continuation-in-part of application No. 15/465,952, filed on Mar. 22, 2017.

(51) Int. Cl.
| | |
|---|---|
| *H04R 31/00* | (2006.01) |
| *B29C 43/02* | (2006.01) |
| *B29C 43/00* | (2006.01) |
| *H04R 7/14* | (2006.01) |
| *D03D 15/00* | (2006.01) |
| *D03D 1/00* | (2006.01) |
| *B29K 1/00* | (2006.01) |
| *B29L 31/34* | (2006.01) |
| *B29K 67/00* | (2006.01) |

(52) U.S. Cl.
CPC ......... *H04R 31/003* (2013.01); *B29C 43/003* (2013.01); *B29C 43/021* (2013.01); *D03D 1/0088* (2013.01); *D03D 15/0027* (2013.01); *H04R 7/14* (2013.01); *B29C 2043/024* (2013.01); *B29K 2001/08* (2013.01); *B29K 2067/00* (2013.01); *B29L 2031/3418* (2013.01); *D10B 2201/20* (2013.01); *D10B 2331/04* (2013.01); *H04R 2307/021* (2013.01); *H04R 2307/025* (2013.01); *H04R 2307/029* (2013.01); *H04R 2307/201* (2013.01)

(58) Field of Classification Search
CPC ............ H04R 31/004; H04R 2307/029; B29C 43/004
See application file for complete search history.

(56) References Cited

U.S. PATENT DOCUMENTS

2005/0232458 A1* 10/2005 Hachiya ................... H04R 7/12
381/426

* cited by examiner

*Primary Examiner* — Robert A Vetere
(74) *Attorney, Agent, or Firm* — Lin & Associates Intellectual Property, Inc.

(57) ABSTRACT

The invention discloses a manufacturing method of a speaker vibrating diaphragm by controlling a ratio of fiber materials, the method comprising the steps of: (A) fabric provision: providing a fabric interwoven by a plurality of warps and a plurality of wefts; (B) impregnation: impregnating the fabric in a resin solution; (C) drying: drying the fabric impregnated with resin solution; (D) formation: pressing the dried resin-impregnating fabric to form a predetermined shape; and (E) cutting: cutting the formed speaker vibrating diaphragm from the fabric. Each of the plurality of warps and each of the plurality of wefts of the fabric has an individual yarn count and material composition. By controlling a combination of the yarn counts of the plurality of warps and the plurality of wefts, a total number of threads and a material composition ratio of the warps and wefts required for the vibrating diaphragm are achieved.

6 Claims, 8 Drawing Sheets

MANUFACTURING METHOD OF A SPEAKER VIBRATING DIAPHRAGM BY CONTROLLING A RATIO OF FIBER MATERIALS

CROSS-REFERENCE TO RELATED APPLICATION

This application is a continuation-in-part of U.S. patent application Ser. No. 15/465,952, filed on Mar. 22, 2017, which is incorporated herewith by reference.

BACKGROUND OF THE INVENTION

1. Field of the Invention

The present invention relates generally to a manufacturing method of a speaker vibrating diaphragm, and more particularly, to a manufacturing method of a speaker vibrating diaphragm by controlling the ratio of fiber material.

2. The Prior Arts

Referring to FIG. 1, a typical moving coil 10 includes a power system, a cone paper 11 and a suspension. The power system further includes a magnet 15, a pole piece, a basket assembly and a voice coil 14. The cone paper 11, which is a vibrating diaphragm for moving air, is typically a sound cone in conical shape or hemispherical shape. The suspension is composed of a damper 12 and a connecting member 13 etc., for drawing a directional movement of the vibrating diaphragm. The operation principle is that when current flows through the voice coil 14, an electromagnetic field perpendicular to the magnetic field of the permanent magnet 15 of the speaker is generated, forcing the voice coil to move within the gap (the gap between the voice coil 14 and the magnet 15). The mechanic force generated by the movement allows the cone paper 11 attached on the voice coil 14 to produce a perpendicular and up-down movement (vibration), so that the air is vibrated to make a sound to be perceived by human ears, thereby implementing a conversion of electric energy to sound energy.

The variety of nonmetal parts inside the conventional speaker 10, such as the cone paper 11, the damper 12 etc., are manufactured by original fabrics; this is because the original fabrics processed by special treatment possesses an appropriate elasticity and intensity that fulfill the function requirements for operating the speaker. These nonmetal parts are collectively called speaker vibrating diaphragms. A conventional method for manufacturing speaker vibrating diaphragms includes steps of resin impregnation, drying, formation, and cutting, to form the final product of speaker vibrating diaphragms.

Although the speaker vibrating diaphragms only accounts for a very small percentage of the cost of the overall speaker, the speaker vibrating diaphragms play critical roles in affecting the sound quality of the speaker. As a result, the manufacturing method of high-quality speaker vibrating diaphragms which fulfill various environmental requirements becomes very important.

Specifically, the fabric material used for manufacturing a conventional speaker vibrating diaphragm is the essential and fundamental structure of the speaker vibrating diaphragm. However, it is rare that techniques in textile industry are applied to the manufacture of the speaker vibrating diaphragm. As a result, the requirements such as the composition of fabric materials, the ratio of number of threads and the like for manufacturing the speaker vibrating diaphragm are restricted within the conventional process performed by traditional textile factories. For example, when manufacturing a speaker vibrating diaphragm, if the speaker vibrating diaphragm is manufactured by a fabric composed of a plurality of materials, it is first required to mix and twist the plurality of raw materials with a specific ratio into yarns as warps and wefts for weaving, so that a fabric with a specific material ratio and yarn count can be obtained. Since this manufacturing method requires mixing and twisting materials into yarns, a high manufacturing cost is required.

SUMMARY OF THE INVENTION

A primary objective of the present invention is to provide a manufacturing method of a speaker vibrating diaphragm by controlling a ratio of fiber materials, so that the requirement of conventional fabric for manufacturing a speaker vibrating diaphragm is alleviated and the processing expense of weaving the fabric is reduced.

In order to achieve the above objective, the present invention provides a manufacturing method of a speaker vibrating diaphragm by controlling a ratio of fiber materials, the method comprising the steps of:

(A) fabric provision: providing a fabric interwoven by a plurality of warps and a plurality of wefts, the warps composed by sequentially and alternatively arranging a plurality of double-stranded first yarns, a plurality of single-stranded second yarns, a plurality of double-stranded third yarns, a plurality of single-stranded fourth yarns and a plurality of double-stranded fifth yarns, the wefts composed by sequentially and alternatively arranging a plurality of double-stranded first yarns, a plurality of single-stranded second yarns, a plurality of double-stranded third yarns, a plurality of single-stranded fourth yarns and a plurality of double-stranded fifth yarns, each of the double-stranded first yarns composed of 50% first fiber and 50% second fiber, each of the single-stranded second yarns composed of 100% first fiber, each of the double-stranded third yarns composed of 50% third fiber and 50% first fiber, each of the single-stranded fourth yarns composed of 100% second fiber, and each of the double-stranded fifth yarns composed of 50% third fiber and 50% fourth fiber;

(B) impregnation: impregnating the fabric in a resin solution;

(C) drying: drying the fabric impregnated with resin solution;

(D) formation: pressing the dried resin-impregnating fabric to form a predetermined shape; and (E) cutting: cutting the formed speaker vibrating diaphragm from the fabric fiber.

In one embodiment, the first fiber is polyester fiber, the second fiber is rayon fiber, the third fiber is aramid fiber, and the fourth fiber is cotton fiber.

Preferably, each of the double-stranded first yarns, the double-stranded third yarns and the double-stranded fifth yarns has a first yarn count, each of the single-stranded second yarns and the single-stranded fourth yarns has a second yarn count, and the first yarn count is less than the second yarn count.

Preferably, the first yarn count is 20 and the second yarn count is 40.

The present invention is thereby beneficial in alleviating the requirement of conventional fabric for manufacturing conventional speaker vibrating diaphragms and reducing the processing expense of weaving fabric materials.

DETAILED DESCRIPTION OF THE PREFERRED EMBODIMENT

The accompanying drawings and reference symbols are included to illustrate embodiments of the present invention so that the invention can be implemented by a skilled person.

Figure 1:
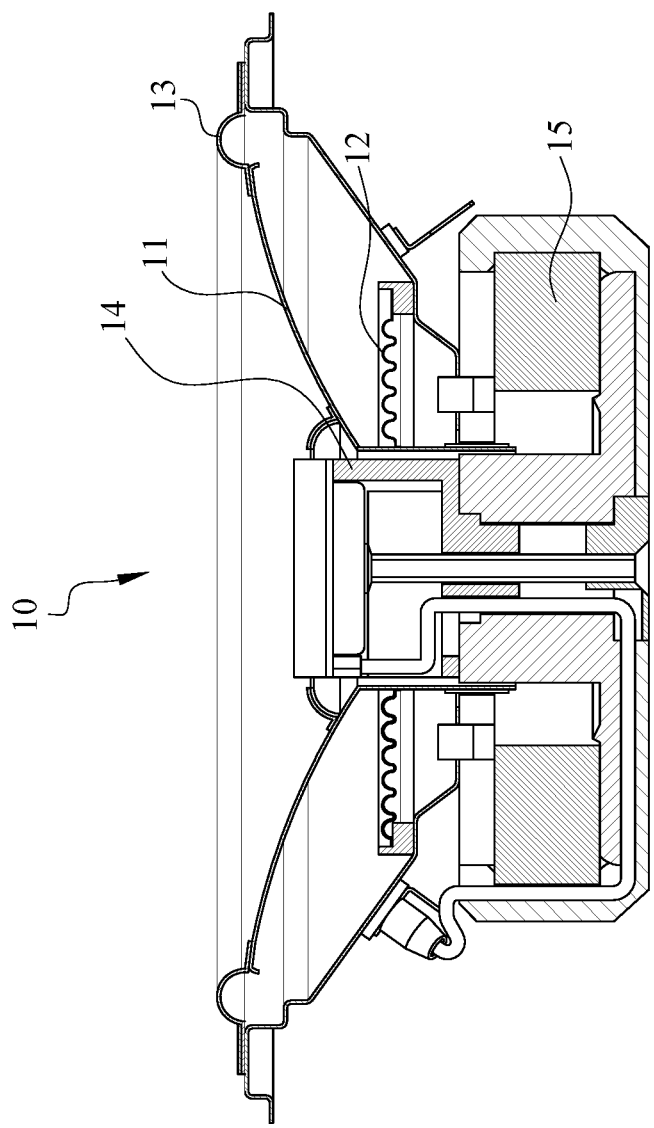
FIG. 1 is a schematic diagram illustrating the structure of a conventional speaker.
Figure 2:
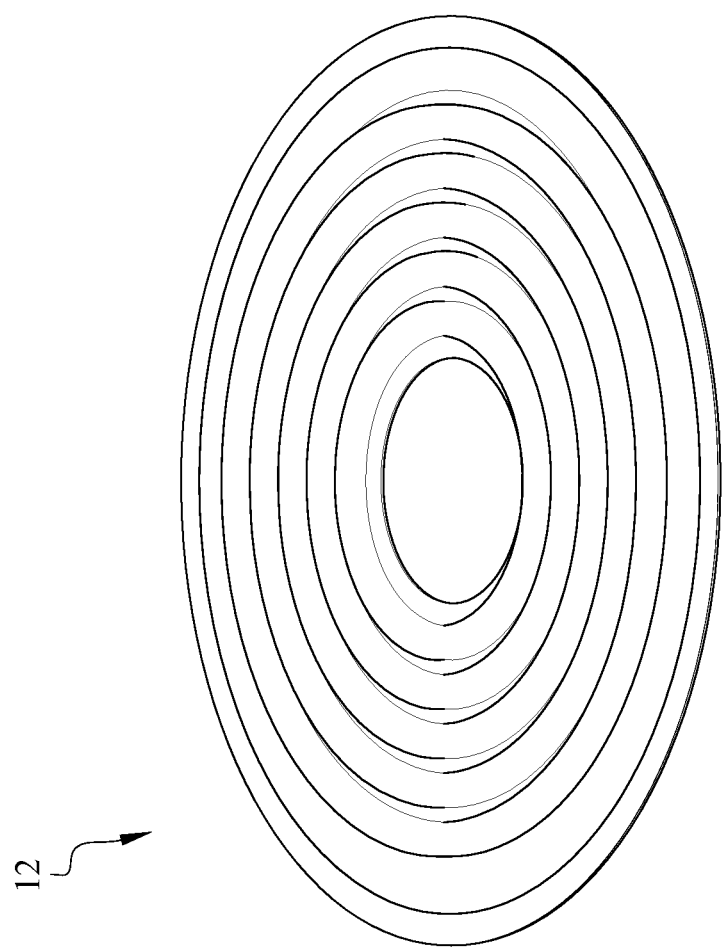
FIG. 2 is a perspective view of a damper of the speaker.
Figure 3:
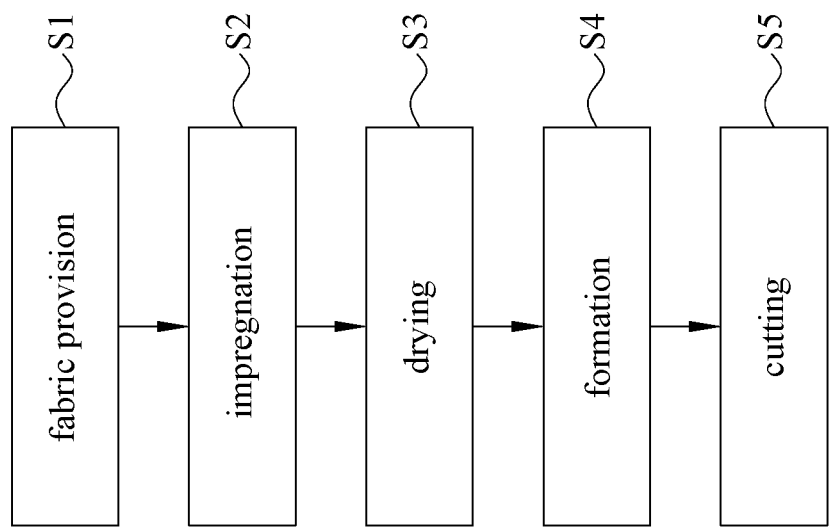
FIG. 3 is a flow diagram of the processing steps of the present invention.
Figure 4:
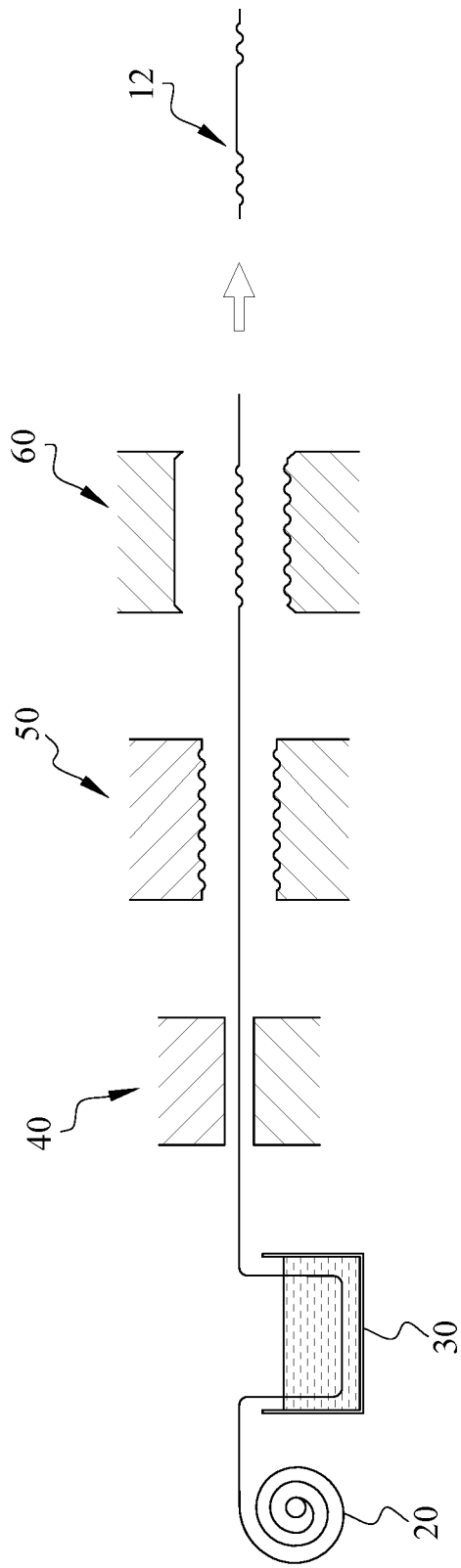
FIG. 4 illustrates the manufacturing process of the present invention.

Referring to FIG. 3 and FIG. 4, which show a flow diagram and a manufacturing process of the present invention respectively. The steps are illustrated hereafter.

Fabric provision (step S1): a fabric 20 is provided. The fabric 20 is interwoven by a plurality of warps and a plurality of wefts (not shown). Each of the plurality of warps of the fabric 20 has an individual yarn count and material composition, and each of the plurality of wefts of the fabric has an individual yarn count and material composition. By controlling a combination of the yarn counts of the plurality of warps and the plurality of wefts, a total number of threads and a material composition ratio of the warps and wefts required for the speaker vibrating diaphragm are achieved.

Impregnation (step S2): the fabric 20 is impregnated in a resin solution 30. In general, resin component can be selected from one or a combination of a group consisting of phenolic resin, epoxy resin, and polyester resin, or from other resin materials possessing with a same property.

Drying (step S3): the fabric 20 impregnated with resin solution is dried. More specifically, the fabric 20 is transferred to a drying device 40 for drying the resin on the fabric 20, such that the fabric 20 is provided with appropriate hardness, elasticity and toughness.

Formation (step S4): after drying the fabric 20 impregnated with resin solution, the fabric 20 is pressed to form a predetermined shape. More specifically, the fabric 20 is transferred to a heat pressing formation device 50 which includes a heating device and a formation mold (comprised of an upper mold and a lower mold). The formation mold is heated to a predetermined temperature and presses the fabric 20 from up and down, such that a predetermined shape of the speaker vibrating diaphragm is formed after pressing and heating the fabric 20.

The formation condition and temperature are determined based on the composition of the fabric and resin solution. In general, the formation temperature of cotton fibers is 245° C.±30° C.; the formation temperature of polyester fibers is 200° C.±30° C.; and the formation temperature of aramid fibers is 240° C.±35° C.

Cutting (step S5): the formed speaker vibrating diaphragm is cut from the fabric 20 to obtain a speaker vibrating diaphragm 12. More specifically, the fabric 20 is transferred to a cutting device 60 to cut the speaker vibrating diaphragm with a predetermined shape from the fabric 20 to obtain the speaker vibrating diaphragm 12. The speaker vibrating diaphragm 12 formed in the figure is a damper, yet other elements of vibrating system such as the cone paper or the connecting member can be manufactured via the same process.

Embodiment 1

As for the conventional manufacturing method, when a speaker damper composed of 50% polyester fibers and 50% rayon fibers with a yarn count of 20 is to be manufactured, the conventional manufacturing method has to mix and twist two materials of fibers with a specific ratio into yarns first. Then, the yarns are used as warps and wefts to be woven to obtain a fabric material with a specific material ratio and yarn count. Since this manufacturing method first requires mixing and twisting polyester fibers and rayon fibers into yarns, the process of mixing and twisting requires high processing expense.

Figure 5A:
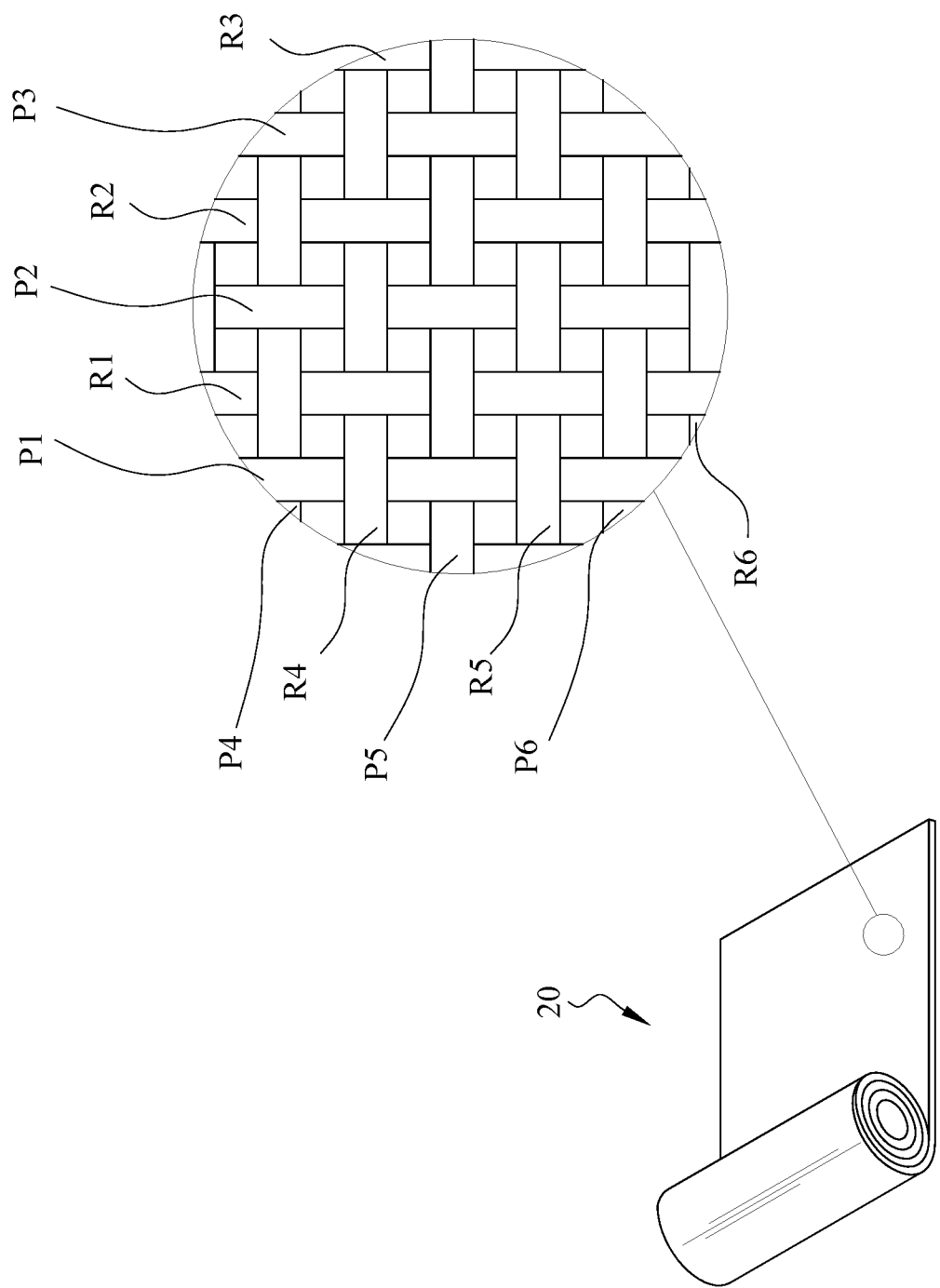
FIG. 5A is a partial enlarged view of Embodiment 1.

However, in the step of fabric provision of the manufacturing method in the present invention, the total number of threads and the material composition ratio of warps and wefts required by the speaker vibrating diaphragm are achieved by controlling the combination of yarn counts of the plurality of warps and the plurality of wefts of the fabric. Referring to FIG. 5A, FIG. 5A shows a partial enlarged view of Embodiment 1. Taken embodiment 1 as the example, the partial enlarged view of the fabric 20 shows that the warps are composed by sequentially and alternatively arranging 100% polyester fibers P1, P2, P3 with yarn counts of 20 and 100% rayon fibers R1, R2, R3 with yarn counts of 20, and the wefts are composed by sequentially and alternatively arranging 100% polyester fibers P4, P5, P6 with yarn counts of 20 and 100% rayon fibers R4, R5, R6 with yarn counts of 20 (as shown in Table 1).

According to the improved manufacturing method of Embodiment 1, mass produced, low cost and easily available 100% polyester fibers and 100% rayon fibers can be used directly as warps and wefts to be arranged alternatively and woven to fabric material as the fabric for manufacturing the speaker vibrating diaphragm. As a result, the processing expense of mixing and twisting different raw materials with a specific ratio into a yarn can be omitted. In the industry of speaker element which has low gross margin and consumes a great amount of manpower and time, the manufacturing method is novel and it greatly reduces processing cost and time required for production.

TABLE 1

| Fiber composition and yarn counts of the warps and wefts in Embodiment 1 | | | | | | |
|---|---|---|---|---|---|---|
| | Fiber material/Number | Polyester Fiber P1 | Rayon Fiber R1 | Polyester Fiber P2 | Rayon Fiber R2 | Polyester Fiber P3 | Rayon Fiber R3 |
| warps | Yarn count (S) | 20 | 20 | 20 | 20 | 20 | 20 |
| | Fiber material/Number | Polyester Fiber P4 | Rayon Fiber R4 | Polyester Fiber P5 | Rayon Fiber R5 | Polyester Fiber P6 | Rayon Fiber R6 |
| wefts | Yarn count (S) | 20 | 20 | 20 | 20 | 20 | 20 |

Embodiment 2

If a speaker damper composed of ⅔ polyester fibers and ⅓ rayon fibers with a yarn count of 20 is to be manufactured, the conventional manufacturing method first requires preparing two materials of fibers, mixing and twisting the fibers with a specific ratio of 2:1 into yarns, and using the yarns as warps and wefts to be woven to obtain a fabric material with a specific material ratio and yarn count. This conventional manufacturing method also requires the process of mixing and twisting with a high manufacturing cost.

Figure 5B:
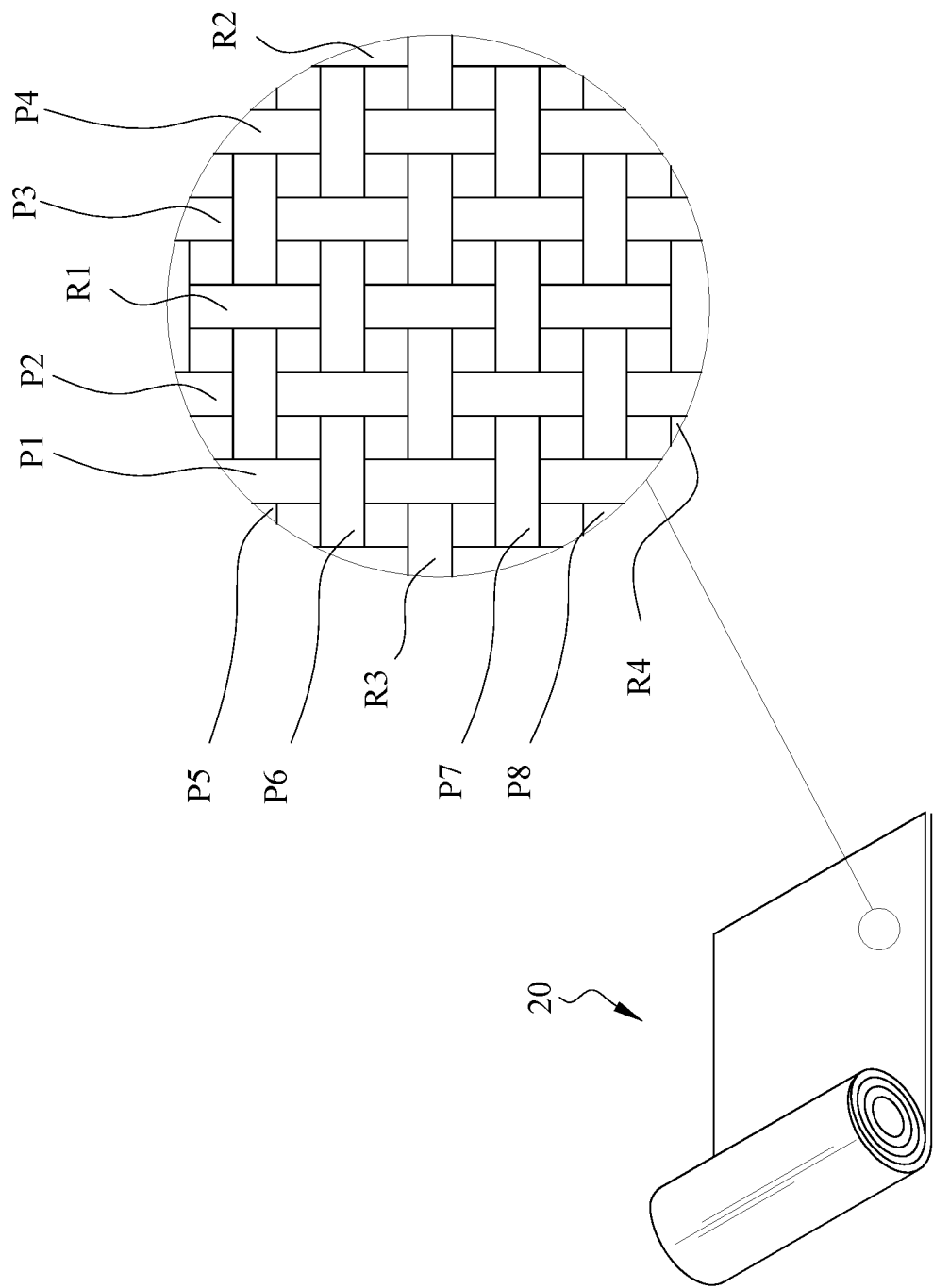
FIG. 5B is a partial enlarged view of Embodiment 2.

Referring to FIG. 5B, FIG. 5B shows a partial enlarged view of Embodiment 2. In Embodiment 2, the threads ratio and the arrangement order of the warps and wefts can be altered to obtain the required total number of threads and material composition ratio of the warps and wefts. Taking Embodiment 2 as the example, the warps are composed by sequentially and alternatively arranging 100% polyester fibers P1, P2, P3, P4 with yarn counts of 20 and 100% rayon fibers R1, R2 with yarn counts of 20, and the wefts are composed by sequentially and alternatively arranging 100% polyester fibers P5, P6, P7, P8 with yarn counts of 20 and 100% rayon fibers R3, R4 with yarn counts of 20 (as shown in Table 2).

TABLE 2

| | Fiber composition and yarn counts of the warps and wefts in Embodiment 2 | | | | | |
|---|---|---|---|---|---|---|
| | Fiber material/Number | Polyester Fiber P1 | Polyester Fiber P2 | Rayon Fiber R1 | Polyester Fiber P3 | Polyester Fiber P4 | Rayon Fiber R2 |
| warps | Yarn count (S) | 20 | 20 | 20 | 20 | 20 | 20 |
| | Fiber material/Number | Polyester Fiber P5 | Polyester Fiber P6 | Rayon Fiber R3 | Polyester Fiber P7 | Polyester Fiber P8 | Rayon Fiber R4 |
| wefts | Yarn count (S) | 20 | 20 | 20 | 20 | 20 | 20 |

Embodiment 3

Furthermore, a speaker damper composed of ⅔ polyester fibers and ⅓ rayon fibers with a yarn count of 20 can be achieved by adjusting fibers with different yarn counts.

Figure 5C:
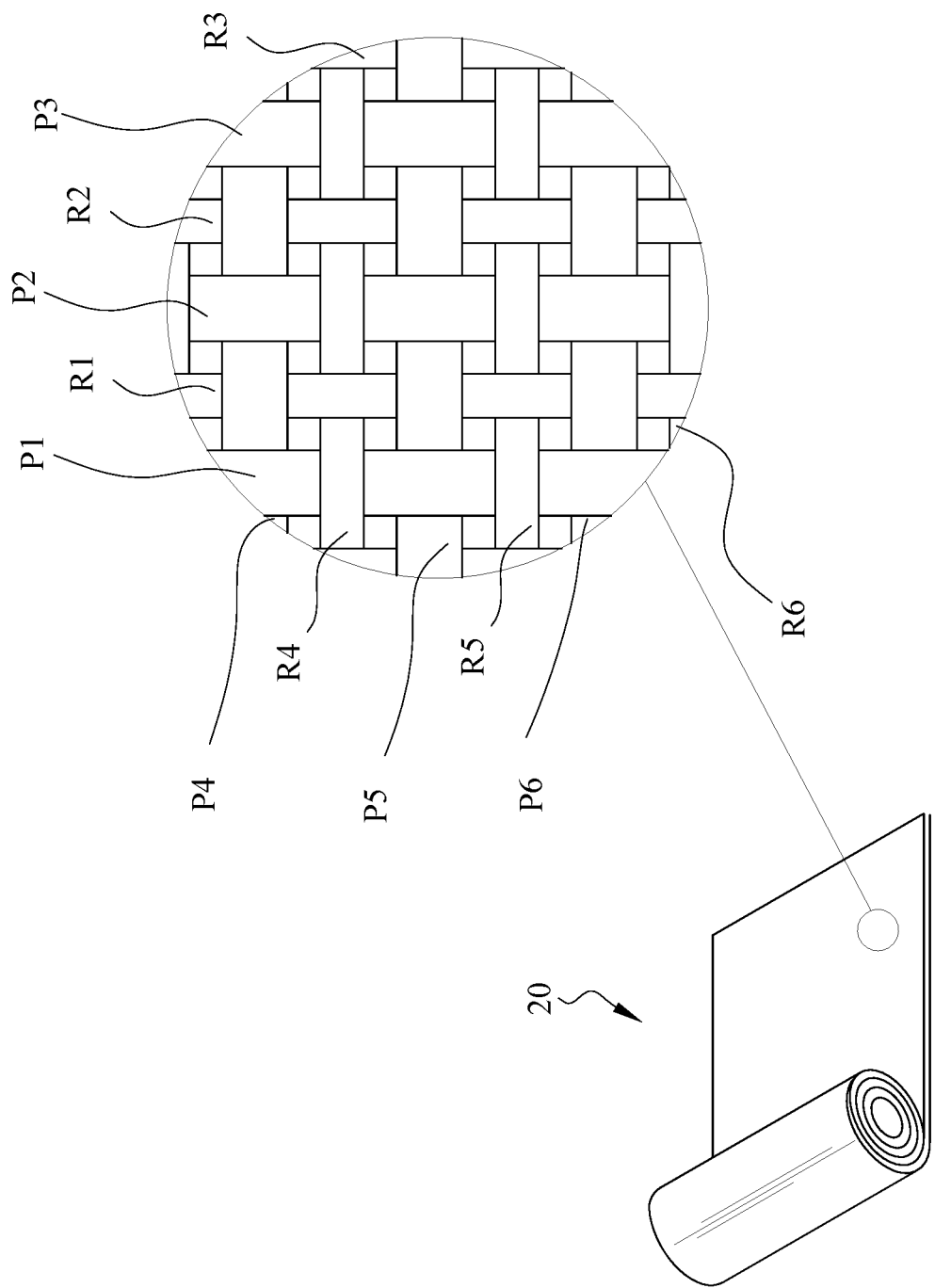
FIG. 5C is a partial enlarged view of Embodiment 3.

Referring to FIG. 5C, FIG. 5C shows a partial enlarged view of Embodiment 3. In Embodiment 3, a speaker damper with required material composition ratio is obtained by alternating yarn counts of part of the warps and wefts. For example, if a speaker vibrating diaphragm composed of ⅔ polyester fibers and ⅓ rayon fibers with a yarn count of 20 is to be manufactured, the warps can be composed by sequentially and alternatively arranging 100% polyester fibers P1, P2, P3 with yarn counts of 20 and 100% rayon fibers R1, R2, R3 with yarn counts of 40, and the wefts can be composed by sequentially and alternatively arranging 100% polyester fibers P4, P5, P6 with yarn counts of 20 and 100% rayon fibers R4, R5, R6 with yarn counts of 40 (as shown in Table 3).

By this way of arranging the warps and wefts with different yarn counts and material compositions, the required specific material composition ratio can be achieved. In Embodiment 3, fibers composed of 100% of a single material are used with combinations of different yarn counts and material combinations to achieve the same object. As a result, the process of mixing and twisting threads can be omitted and high expenses thereof can be reduced.

TABLE 3

| | Fiber composition and yarn counts of the warps and wefts in Embodiment 3 | | | | | |
|---|---|---|---|---|---|---|
| | Fiber material/Number | Polyester Fiber P1 | Rayon Fiber R1 | Polyester Fiber P2 | Rayon Fiber R2 | Polyester Fiber P3 | Rayon Fiber R3 |
| warps | Yarn count (S) | 20 | 40 | 20 | 40 | 20 | 40 |
| | Fiber material/Number | Polyester Fiber P4 | Rayon Fiber R4 | Polyester Fiber P5 | Rayon Fiber R5 | Polyester Fiber P6 | Rayon Fiber R6 |
| wefts | Yarn count (S) | 20 | 40 | 20 | 40 | 20 | 40 |

Embodiment 4

If a speaker damper composed of various material of fibers, such as polyester fibers, rayon fibers, aramid fibers, cotton fibers, in specific ratio is to be composed, the conventional manufacturing method requires first preparing the various materials of fibers, mixing and twisting the fibers with a specific ratio into yarns, and using the yarns as warps and wefts to be woven to obtain a fabric material with a specific material ratio and yarn count. This process of mixing and twisting various materials has a higher processing expense than the process of mixing and twisting only two materials. In addition, this type of speaker damper with special material ratio specified by a speaker damper factory must be customized. As a result, the manufacturing cost of the speaker damper is higher.

Figure 5D:
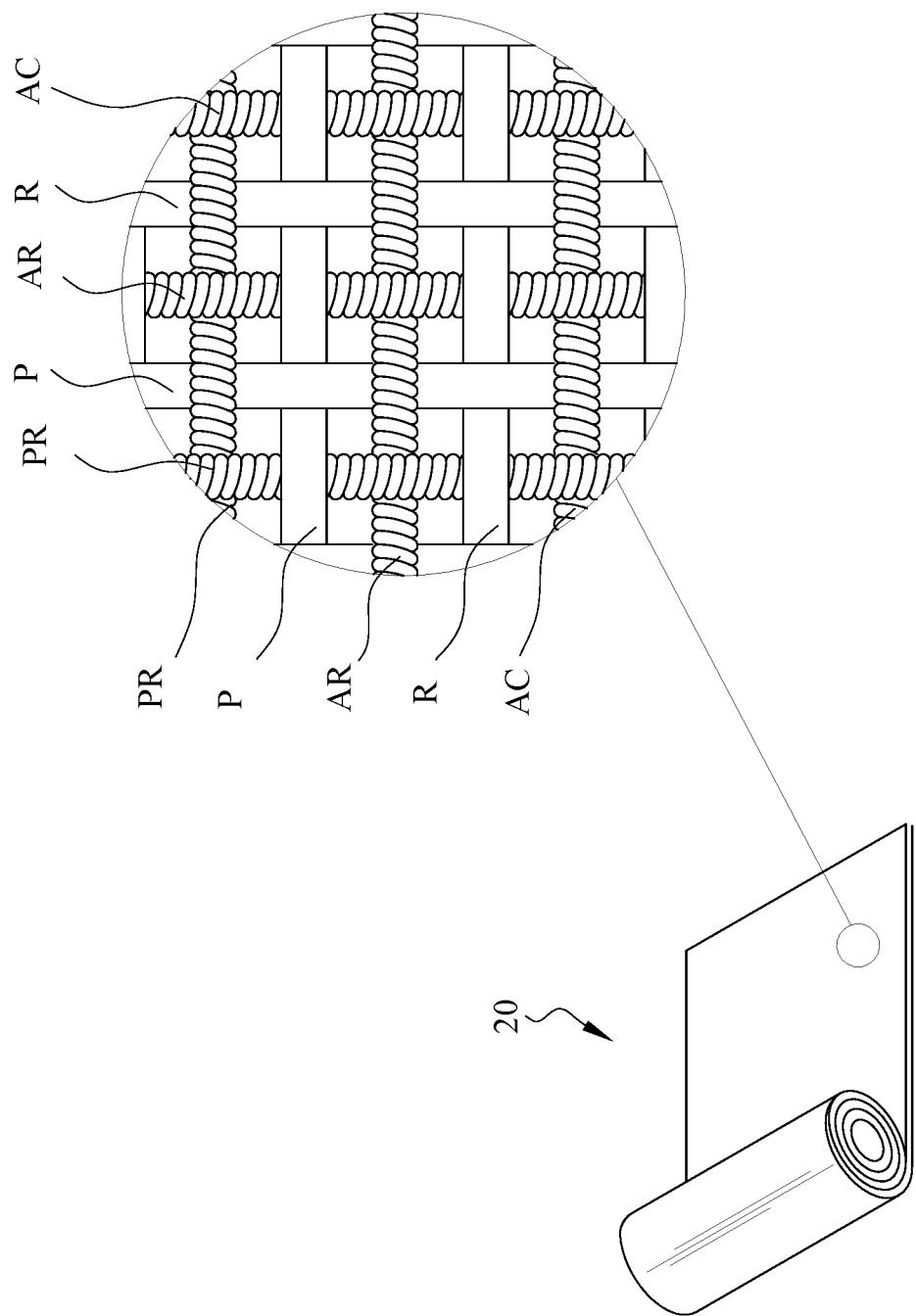
FIG. 5D is a partial enlarged view of Embodiment 4.

Referring to FIG. 5D, FIG. 5D shows a partial enlarged view of Embodiment 4. In Embodiment 4, the total number of threads and the material composition ratios of the warps and wefts required can be achieved by collocating material fibers with different compositions and using specified number of threads ratio and arrangement order.

The warps are composed by sequentially and alternatively arranging a plurality of double-stranded first yarns PR, a plurality of single-stranded second yarns P, a plurality of double-stranded third yarns AR, a plurality of single-stranded fourth yarns R, and a plurality of double-stranded fifth yarns AC. Each of the double-stranded first yarns PR is composed of 50% first fiber and 50% second fiber, each of the single-stranded second yarns is composed of 100% first fiber, each of the double-stranded third yarns AR is composed of 50% third fiber and 50% first fiber, each of the single-stranded fourth yarns R is composed of 100% second fiber, and each of the double-stranded fifth yarns AC is composed of 50% third fiber and 50% fourth fiber (as shown in Table 4).

The wefts are composed by sequentially and alternatively arranging a plurality of double-stranded first yarns PR, a plurality of single-stranded second yarns P, a plurality of double-stranded third yarns AR, a plurality of single-stranded fourth yarns R, and a plurality of double-stranded fifth yarns AC. Each of the double-stranded first yarns PR is composed of 50% first fiber and 50% second fiber, each of the single-stranded second yarns is composed of 100% first fiber, each of the double-stranded third yarns AR is composed of 50% third fiber and 50% first fiber, each of the single-stranded fourth yarns R is composed of 100% second fiber, and each of the double-stranded fifth yarns AC is composed of 50% third fiber and 50% fourth fiber (as shown in Table 4).

The first fiber is polyester, the second fiber is rayon fiber, the third fiber is aramid fiber, and the fourth fiber is cotton fiber.

Each of the double-stranded first yarns PR, the double-stranded third yarns AR and the double-stranded fifth yarns AC has a first yarn count. Each of the single-stranded second yarns P and the single-stranded fourth yarns R has a second yarn count. The first yarn count is less than the second yarn count. Preferably, the first yarn count is 20 and the second yarn count is 40. In other words, each of the double-stranded first yarns PR has a yarn count of 20, each of the single-stranded second yarns P has a yarn count of 40, each of the double-stranded third yarns AR has a yarn count of 20, each of the single-stranded fourth yarns R has a yarn count of 40, and each of the double-stranded fifth yarns AC has a yarn count of 20 (as shown in Table 4).

Embodiment 4 shows a further applicable example, in which various materials including polyester fibers, rayon fibers, aramid fibers and cotton fibers etc. that can be applied as the speaker damper are taken to be used as 100% single yarns, or composite yarns (double-stranded, triple-stranded, quadruple-stranded, etc.) mixed and twisted by at least two materials with specific ratios, and arranged with different yarn counts. In addition to the possible combinations thereof, the sequential order in warps and wefts are sorted to mix and weave a fabric meeting specific requirements as a fabric for manufacturing a speaker vibrating diaphragm. Although Embodiment 4 similarly uses double-stranded fibers, composite yarns (double-stranded, triple-stranded, quadruple-stranded fibers, etc.) that are non-customized and have a common material mixing ratio can be used so that the manufacturing cost is still lower than conventional customized yarns by mixing and twisting materials.

TABLE 4

Fiber composition and yarn counts of the warps and wefts in Embodiment 4

| | | First Yarn (First Fiber: Polyester Fiber + Second Fiber: Rayon Fiber) PR | Second Yarn (First Fiber: Polyester Fiber) P | Third Yarn (Third Fiber: Aramid Fiber + First Fiber: Polyester Fiber) AR | Fourth Yarn (Second Fiber: Rayon Fiber) R | Fifth Yarn (Third Fiber: Aramid Fiber + Fourth Fiber: Cotton Fiber) AC |
|---|---|---|---|---|---|---|
| Warps | Fiber material/Number | | | | | |
| | Yarn Count (S) | 20 | 40 | 20 | 40 | 20 |
| Wefts | Fiber material/Number | First Yarn (First Fiber: Polyester Fiber + Second Fiber: Rayon Fiber) PR | Second Yarn (First Fiber: Polyester Fiber) P | Third Yarn (Third Fiber: Aramid Fiber + First Fiber: Polyester Fiber) AR | Fourth Yarn (Second Fiber: Rayon Fiber) R | Fifth Yarn (Third Fiber: Aramid Fiber + Fourth Fiber: Cotton Fiber) AC |
| | Yarn Count (S) | 20 | 40 | 20 | 40 | 20 |

The above description is only for illustrating the preferred embodiments of the present invention, but not for restricting the present invention in any forms. It is apparent to those skilled in the art that a variety of modifications and changes may be made without departing from the scope of the present invention which is intended to be defined by the appended claims.

What is claimed is:

1. A manufacturing method of a speaker vibrating diaphragm by controlling a ratio of fiber materials, the method comprising the steps of:

(A) fabric provision: providing a fabric interwoven by a plurality of warps and a plurality of wefts, the warps composed by sequentially and alternatively arranging a plurality of double-stranded first yarns, a plurality of single-stranded second yarns, a plurality of double-stranded third yarns, a plurality of single-stranded fourth yarns and a plurality of double-stranded fifth yarns, the wefts composed by sequentially and alternatively arranging a plurality of double-stranded first yarns, a plurality of single-stranded second yarns, a plurality of double-stranded third yarns, a plurality of single-stranded fourth yarns and a plurality of double-stranded fifth yarns, each of the double-stranded first yarns composed of 50% first fiber and 50% second fiber, each of the single-stranded second yarns composed of 100% first fiber, each of the double-stranded third yarns composed of 50% third fiber and 50% first fiber, each of the single-stranded fourth yarns composed of 100% second fiber, and each of the double-stranded fifth yarns composed of 50% third fiber and 50% fourth fiber;
(B) impregnation: impregnating the fabric in a resin solution;
(C) drying: drying the fabric impregnated with resin solution;
(D) formation: pressing the dried resin-impregnating fabric to form a predetermined shape; and
(E) cutting: cutting the formed speaker vibrating diaphragm from the fabric fiber.

2. The manufacturing method according to claim 1, wherein the first fiber is polyester fiber, the second fiber is rayon fiber, the third fiber is aramid fiber, and the fourth fiber is cotton fiber.

3. The manufacturing method according to claim 2, wherein each of the double-stranded first yarns, the double-stranded third yarns and the double-stranded fifth yarns has a first yarn count, each of the single-stranded second yarns and the single-stranded fourth yarns has a second yarn count, and the first yarn count is less than the second yarn count.

4. The manufacturing method according to claim 3, wherein the first yarn count is 20 and the second yarn count is 40.

5. The manufacturing method according to claim 1, wherein each of the double-stranded first yarns, the double-stranded third yarns and the double-stranded fifth yarns has a first yarn count, each of the single-stranded second yarns and the single-stranded fourth yarns has a second yarn count, and the first yarn count is less than the second yarn count.

6. The manufacturing method according to claim 5, wherein the first yarn count is 20 and the second yarn count is 40.

* * * * *